United States Patent
Zhou et al.

(10) Patent No.: US 11,198,756 B2
(45) Date of Patent: Dec. 14, 2021

(54) BLEND FOR CURING EPOXY RESIN COMPOSISTIONS

(71) Applicant: Huntsman Petrochemical LLC, The Woodlands, TX (US)

(72) Inventors: Hui Zhou, The Woodlands, TX (US); David C Lewis, Conroe, TX (US); Howard P. Klein, Austin, TX (US); Robert A. Grigsby, Spring, TX (US); Feixia Chen, Kessel-lo (BE); Katty Darragas, Oudenaarde (BE)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 0 days.

(21) Appl. No.: 16/069,219

(22) PCT Filed: Jun. 16, 2017

(86) PCT No.: PCT/US2017/037941
§ 371 (c)(1),
(2) Date: Jul. 11, 2018

(87) PCT Pub. No.: WO2017/218934
PCT Pub. Date: Dec. 21, 2017

(65) Prior Publication Data
US 2019/0100616 A1 Apr. 4, 2019

Related U.S. Application Data

(60) Provisional application No. 62/350,985, filed on Jun. 16, 2016.

(51) Int. Cl.
*C08G 59/50* (2006.01)
*C08J 5/04* (2006.01)
*C08G 59/56* (2006.01)

(52) U.S. Cl.
CPC ..... *C08G 59/5073* (2013.01); *C08G 59/5006* (2013.01); *C08G 59/5013* (2013.01);
(Continued)

(58) Field of Classification Search
None
See application file for complete search history.

(56) References Cited

U.S. PATENT DOCUMENTS

| 4,528,308 A | 7/1985 | Waddill |
| 5,639,413 A | 6/1997 | Crivello |

(Continued)

FOREIGN PATENT DOCUMENTS

CN 105670223 6/2016

OTHER PUBLICATIONS

English language machine translation of CN 105670223, the original reference published Jun. 15, 2016 (Year: 2016).*

(Continued)

*Primary Examiner* — Megan McCulley
(74) *Attorney, Agent, or Firm* — Huntsman Petrochemical LLC; Aleece M. Hayes (57) ABSTRACT

The present disclosure provides a curable composition that includes an epoxy resin and a curing component comprising a blend of at least two amines. The curable composition may be combined with reinforced fibers and cured to form a composite article which can be used in various applications, such as in wind turbine blades.

5 Claims, 2 Drawing Sheets

(52) U.S. Cl.
CPC ......... *C08G 59/5026* (2013.01); *C08G 59/56* (2013.01); *C08J 5/04* (2013.01); *C08J 2363/00* (2013.01)

(56) References Cited

U.S. PATENT DOCUMENTS

| | | |
|---|---|---|
| 7,816,581 B2 | 10/2010 | Gilbertson et al. |
| 8,741,426 B2 | 6/2014 | Wittenbecher et al. |
| 8,852,489 B2 | 10/2014 | Wittenbecher et al. |
| 2011/0319564 A1 | 12/2011 | Corley et al. |
| 2012/0328811 A1 | 12/2012 | Patel et al. |
| 2013/0225788 A1 | 8/2013 | Meegan |
| 2015/0094400 A1* | 4/2015 | Zheng ................. C08G 59/60 523/222 |

OTHER PUBLICATIONS

"The JEFFAMINE Polyetheramines" 2007 p. 1 col. 2 para [0001], p. 2 col. 1 para [0002].

* cited by examiner

BLEND FOR CURING EPOXY RESIN COMPOSISTIONS

CROSS-REFERENCE TO RELATED APPLICATION

This application is a National Stage Application filed under 35 U.S.C. § 371 of International Application Number PCT/US2017/037941, filed Jun. 16, 2017, which claims the benefit of U.S. Provisional Patent Application Ser. No. 62/350,985, filed Jun. 16, 2016, the entire contents of which are expressly incorporated herein by reference.

STATEMENT REGARDING FEDERALLY SPONSORED RESEARCH OR DEVELOPMENT

Not applicable.

FIELD

The present disclosure generally relates to a curable composition that includes an epoxy resin and a curing component comprising a polyetheramine, an accelerant selected from an imidazole and/or a tertiary amine, and, optionally, a second amine, and to the use of the curable composition for producing fiber-reinforced composite articles, including, but not limited to, wind turbine blades.

BACKGROUND

In order to convert epoxy resins into useful products, they must be "cured" or cross-linked by chemical reaction into a three-dimensional, infusible network by the use of a curing agent. Curing agents function by reacting with or causing the reaction of the epoxide or hydroxyl groups in the epoxy resin. Generally, this proceeds by two possible routes: i) by the reaction of epoxide groups themselves (homopolymerization); or ii) by reaction of the epoxy and/or hydroxyl functionality with a reactive intermediate or curing agent.

Three major chemical types of curing agents are typically employed in structural applications of epoxy resins and include amines, acid anhydrides and Lewis acids. The amines can be further divided into aliphatic, cycloaliphatic and aromatic amines. All of the amines, as well as the acid anhydrides, react with the epoxy ring by nucleophilic addition to the terminal carbon atom of the epoxide to give the corresponding β-hydroxyamine or β-hydroxyester, respectively. Lewis acids cure epoxy resins by homopolymerization of the epoxide.

Since aliphatic amines are more nucleophilic than cycloaliphatic and aromatic amines, they will react much more rapidly with epoxy resins at room temperature. Accordingly, they afford relatively short working lives (approximately 30 minutes with a liquid epoxy resin). Cycloaliphatic amines, being more hindered than linear aliphatic amines, react more slowly and therefore require mild heat for curing. Finally, aromatic amines react sluggishly at room temperature resulting in long working lives, and therefore are used when curing at high temperature.

In comparison, acid anhydrides provide long working lives, however they require careful storage so as to prevent degradation as a result of moisture absorption. They also require the application of heat and a small amount of accelerator in order to initiate full cure.

Finally, Lewis acids, and in particular boron trifluoride, when added in small amounts, function as a catalyst by cationically homopolymerizing the epoxy molecules into a polyether. However, because boron trifluoride causes very rapid and highly exothermic polymerization of the epoxy resin, blocking techniques to halt the room temperature reaction must be used when other than very small amounts of resin are being cured.

Most work in the area of improving the curing of epoxy resins has involved the use of one or more amines as the curing agent, for example:

U.S. Pat. No. 7,816,581 describes the use of at least two polyetheramines to cure an epoxy resin;

U.S. Pat. No. 8,741,426 describes a blend of a polyetheramine, a second amine having a functionality of at least 2 and a guanidine derivative and its use in curing epoxy resins;

U.S. Pat. App. Publ. No. 2011/0319564 discloses a mixture of an amine having the formula R1R2R3N wherein R1 and R2 are independently an aliphatic or alicyclic organic functional group and R3 is an alkyl group having a backbone of 2-18 carbon atoms, and a polyetheramine and the use of such mixture to cure an epoxy resin;

U.S. Pat. App. Publ. No. 2012/0328811 discloses the use of a primary curing component containing a large amount of cycloaliphatic amine and small amount of polyetheramine and a secondary curing component containing an imidazole; and U.S. Pat. App. Publ. No. 2013/0225788 describes a curing agent mixture containing at least one aliphatic or cycloaliphatic amine, an aromatic amine and an imidazole and which is capable of curing an epoxy resin at a temperature equal to or less than 120° C.

In spite of state of the art amine curing agents, there is a need to develop new, versatile curing agents that, when combined with an epoxy resin to form a curable composition, do not cause the curable composition's viscosity to increase so sharply that it does not maintain sufficient flowability and do not adversely affect the cycle time (processing and curing).

SUMMARY

The present disclosure provides a curable composition comprising (i) an epoxy resin; and (ii) a curing component comprising a polyetheramine, an accelerant selected from an imidazole, a tertiary amine, and combinations thereof, and, optionally, a second amine.

In one aspect, the curable composition is substantially free of a cyclic carbonate, guanidine and derivatives thereof, and an aromatic amine.

In yet another aspect there is provided a method for preparing the curable composition by combining the epoxy resin and curing component.

In still another aspect, there is a provided a process for producing a composite article including the steps of: (i) providing a layer or bundle of reinforcement fibers; (ii) providing the curable composition; (iii) contacting the reinforcement fibers with the curable composition to coat and/or impregnate the reinforcement fibers; and (iv) curing the coated and/or impregnated reinforcement fibers at a temperature of at least about 60° C.

DETAILED DESCRIPTION

The present disclosure generally provides a curable composition comprising (i) an epoxy resin; and (ii) a curing component comprising a polyetheramine, an accelerant selected from an imidazole, a tertiary amine, and combinations thereof, and, optionally, a second amine. In one embodiment, the curing component is substantially free of a cyclic carbonate, guanidine and derivatives thereof, and an aromatic amine.

In one particular embodiment, the present disclosure is directed to a curable composition comprising (i) an epoxy resin; and (ii) a curing component comprising a polyetheramine, a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N-dimethylcyclohexylamine, methyl dicyclohexylamine, N,N,N'-trimethyl-N'-(2-hydroxyethyl)bis(2-aminoethyl) ether, bis-(2-dimethylaminoethyl) ether, N,N'-dimethyl piperazine, 1,3,5-tris(3-(dimethylamino)propyl)-hexahydro-s-triazine, 2,4,6-tris(dimethylaminomethyl) phenol, and combinations thereof, and, optionally, a second amine.

In another embodiment, the present disclosure is directed to a curable composition comprising (i) an epoxy resin; and (ii) a curing component comprising two or more polyetheramines, a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N-dimethylcyclohexylamine, methyl dicyclohexylamine, N,N,N'-trimethyl-N'-(2-hydroxyethyl)bis(2-aminoethyl) ether, bis-(2-dimethylaminoethyl) ether, N,N'-dimethyl piperazine, 1,3,5-tris(3-(dimethylamino)propyl)-hexahydro-s-triazine, 2,4,6-tris(dimethylaminomethyl) phenol, and combinations thereof, and, optionally, a second amine.

In yet another embodiment, the present disclosure is directed to a curable composition comprising (i) an epoxy resin; and (ii) a curing component comprising a polyetheramine, a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N,N'-trimethyl-N'-(2-hydroxyethyl)bis(2-aminoethyl) ether, bis-(2-dimethylaminoethyl) ether, N,N'-dimethyl piperazine, 1,3,5-tris(3-(dimethylamino)propyl)-hexahydro-s-triazine, and combinations thereof, and, optionally, a second amine, wherein the curing component is substantially free of a cyclic carbonate, guanidine and derivatives thereof, and an aromatic amine. The curing component can further comprise an imidazole.

It has been surprisingly found that the curing component of the present disclosure not only has the ability to extend the working life of the curable composition but can also rapidly cure the epoxy resin to provide a cured article having an excellent balance of thermal and mechanical properties. Since the curable composition maintains a low viscosity and long working life which are typically required for composite fabrication, it is particularly suitable for use in the fabrication of composite articles by filament winding, resin infusion, hand lay-up, vacuum assisted resin transfer process, pultrusion and prepregs. The specific composite articles may include, but are not limited to, pipes, fittings, tanks, high pressure vessels, wind turbine blades, boats and composite tools.

The following terms shall have the following meanings.

As used herein, the term "curing" or "cure" refers to the hardening of an epoxy resin by chemical cross-linking. The term "curable" means that the composition is capable of being subjected to conditions which will render the composition to a cured or thermoset state or condition.

The term "aromatic amine" refers to a primary, secondary or tertiary amine containing an aryl moiety, with the term "aryl" referring to a substituted or unsubstituted aromatic carbocyclic radical having 6 to 14 carbon atoms.

The term "cyclic carbonate" refers to a cyclic compound having a carbonate ($CO_3$) group as part of the cyclic compound.

The term "guanidine and derivatives thereof" refers to a guanidine compound and derivatives of a guanidine compound where at least one of the amino hydrogens is substituted with a $C_1$-$C_{20}$ alkyl group.

The term "substantially free" means, when used with reference to the substantial absence of a material in a formulation, that such a material is not present, or if at all, as an incidental impurity or by-product. In other words, the material does not affect the properties of the formulation.

The term "working life" means the working time or the length of time that a catalyzed curable composition retains a viscosity low enough to be used in processing.

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

As used herein, the term "Amine/Epoxy Stoichiometric Ratio" means the ratio of the number of amine hydrogen bonds (i.e., —NH bonds) of the amine-containing compound(s) to the number of epoxy groups of the epoxy resin. For example, an Amine/Epoxy Stoichiometric Ratio of 1:1 means the amine(s) and epoxy resin(s) have an equal number of amine hydrogen bonds and epoxy groups.

The articles "a" and "an" are used herein to refer to one or more than one (i.e. to at least one) of the grammatical object of the article. By way of example, "an epoxy resin" means one epoxy resin or more than one epoxy resin.

The phrases "in one aspect", "according to one aspect", "in one embodiment", "according to one embodiment", and the like generally mean the particular feature, structure, or characteristic following the phrase is included in at least one aspect or embodiment of the present disclosure, and may be included in more than one aspect or embodiment of the present disclosure. Importantly, such phases do not necessarily refer to the same aspect or embodiment.

If the specification states a component or feature "may", "can", "could", or "might" be included or have a characteristic, that particular component or feature is not required to be included or have the characteristic.

Curable Composition

The present disclosure generally provides a curable composition comprising (i) an epoxy resin; and (ii) a curing component comprising a polyetheramine, an accelerator selected from an imidazole, a tertiary amine, and combinations thereof, and, optionally, a second amine. In one embodiment, the curing component is substantially free of a cyclic carbonate, guanidine and derivatives thereof, and an aromatic amine.

In one embodiment, the accelerant is an imidazole. One such embodiment of the curable composition includes: (i) an epoxy resin; and (ii) a curing component comprising (a) greater than 20 parts by weight, based on 100 parts by weight of the curing component, of a polyetheramine, (b) greater than 1 part by weight, based on 100 parts by weight of the curing component, of an imidazole, and, optionally, (c) a second amine, wherein the curable composition is substantially free of a cyclic carbonate, guanidine and derivatives thereof, and an aromatic amine.

In another embodiment, the accelerant is a tertiary amine. The tertiary amine can be selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N-dimethylcyclohexylamine, methyl dicyclohexylamine, N,N,N'-trimethyl-N'-(2-hydroxyethyl)bis(2-aminoethyl)ether, bis-(2-dimethylaminoethyl) ether, N,N'-dimethyl piperazine, 1,3,5-tris(3-(dimethylamino)propyl)-hexahydro-s-triazine, 2,4,6-tris(dimethylaminomethyl) phenol, and combinations thereof.

In yet another embodiment, the accelerant is imidazole and a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N-dimethylcyclohexylamine, methyl dicyclohexylamine, N,N,N'-trimethyl-N'-(2-hydroxyethyl)bis(2-aminoethyl)ether, bis-(2-dimethylaminoethyl) ether, N,N'-dimethyl piperazine, 1,3,5-tris(3-(dimethylamino)propyl)-hexahydro-s-triazine, 2,4,6-tris(dimethylaminomethyl) phenol, and combinations thereof.

In still a further embodiment, the accelerant is a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N,N'-trimethyl-N'-(2-hydroxyethyl)bis(2-aminoethyl)ether, bis-(2-dimethylaminoethyl) ether, N,N'-dimethyl piperazine, 1,3,5-tris(3-(dimethylamino)propyl)-hexahydro-s-triazine, and combinations thereof, and the curing component is substantially free of a cyclic carbonate, guanidine and derivatives thereof, and an aromatic amine.

According to one aspect, the curable composition comprises an epoxy resin. In general, any epoxy-containing compound is suitable for use as the epoxy resin in the present disclosure, such as the epoxy-containing compounds disclosed in U.S. Pat. No. 5,476,748 which is incorporated herein by reference. The epoxy resin may be solid or liquid. In one embodiment, the epoxy resin is selected from the group of: a polyglycidyl epoxy compound; a non-glycidyl epoxy compound; an epoxy cresol novolac compound; an epoxy phenol novolac compound; and a mixture thereof.

The polyglycidyl epoxy compound may be a polyglycidyl ether, poly(β-methylglycidyl) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis(2-hydroxyethyl)aniline or p,p'-bis(2-hydroxyethylamino) diphenylmethane.

Particularly important representatives of polyglycidyl ethers or poly(β-methylglycidyl)ethers are based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)sulfone (Bisphenol S), alkoxylated Bisphenol A, F or S, triol extended Bisphenol A, F or S, brominated Bisphenol A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(P-methylglycidyl)esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, may be used.

In another aspect, the epoxy resin is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups.

Particular examples of non-glycidyl epoxy compound's include the following difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl.

In some particular aspects, the difunctional non-glycidyl epoxy compounds include cycloaliphatic difunctional non-glycidyl epoxies, such as 3,4-epoxycyclohexyl-methyl 3',4'-epoxycyclohexanecarboxylate and 2,2'-bis-(3,4-epoxy-cyclohexyl)-propane, with the former being most preferred.

In yet another aspect, the epoxy resin is a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl)ether.

It is also possible to employ epoxy resins in which the 1,2-epoxide groups are attached to different heteroatoms or functional groups. Examples include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Other epoxide derivatives may also be employed, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methylpropoxy)ethane.

Additionally, the epoxy resin may be a pre-reacted adduct of an epoxy resin, such as those mentioned above, with compounds having a free hydrogen that is reactive with an epoxy group. Typically, such reactive hydrogens are found in carboxylic acid groups, aromatic hydroxyl groups, amino groups, and sulfhydryl groups.

In another aspect, the curable composition comprises a curing component. The curing component may include greater than 40 parts by weight, based on 100 parts by weight of the curing component, of a polyetheramine.

In some aspects, the polyetheramine may be selected from the group of a polyether monoamine, a polyether diamine, a polyether triamine and a mixture thereof.

Thus, according to one aspect, the polyetheramine is a polyether monoamine having the formula (1) or (1a):

(1)

where R is hydrogen or methyl, and
a and b independently are integers from about 1 to about 150; or (1a)

where Y is hydrogen or methyl,
Z is a $C_1$-$C_{40}$ alkyl group or a $C_1$-$C_{40}$ alkyl phenol group and
w is an integer from about 1 to about 100.

In still another aspect, the polyetheramine is a polyether monoamine having the formula (2) or (2a):

(2)

(2a)

Commercially available polyether monoamines include the JEFFAMINE® M-series and XTJ-series amines, including, but not limited to, JEFFAMINE® M-600, M-1000, M-2005, M-2070, XTJ-435 and XTJ-436 amines, available from Huntsman Petrochemical LLC.

According to another aspect, the polyetheramine is a polyether diamine having the formula (3), (4) or (5):

(3)

where c is an integer from about 2 to about 100;

(4)

where e is an integer from about 2 to about 40, and
d and f independently are integers from about 1 to about 10; or (5)

where g is an integer from about 2 to about 3.
Commercially available polyether diamines include the JEFFAMINE® D, ED and EDR amines, including, but not limited to, JEFFAMINE® D-230, D-400, D-2000, D-4000, ED-600, ED-900, ED-20003, EDR-148 and EDR-176 amines, available from Huntsman Petrochemical LLC.

According to another aspect, the curing component includes a polyether triamine having the formula (6):

where $R_1$ is hydrogen, methyl or ethyl,
n is an integer of 0 or 1, and
h, i and j independently are integers from about 1 to about 100.

Commercially available polyether triamines include the JEFFAMINE® T-series amines, including, but not limited to, JEFFAMINE® T-403, T-3000 and T-5000 amines, available from Huntsman Petrochemical LLC.

In one particular aspect, the curing component includes the polyetheramine in an amount of at least 50 parts by weight, based on 100 parts by weight of the curing component. In still another aspect, the curing component includes the polyetheramine in an amount of at least 60 parts by weight, based on 100 parts by weight of the curing component. In still another aspect, the curing component includes the polyetheramine in an amount of at least 70 parts by weight, or in an amount of at least 80 parts by weight, based on 100 parts by weight of the curing component.

In a further aspect, the curing component includes the polyetheramine in an amount greater than 10 parts by weight to less than 90 parts by weight, or an amount greater than 20 parts by weight to less than 90 parts by weight, or an amount greater than 30 parts by weight to less than 90 parts by weight, or an amount greater than 40 parts by weight to less than 90 parts by weight, based on 100 parts by weight of the curing component. In yet another aspect, the curing component includes the polyetheramine in an amount between 55 parts by weight to about 75 parts by weight, based on 100 parts by weight of the curing component.

The curable component can also include a second amine. Polyetheramines are excluded from being included as the second amine. Accordingly, in one aspect, the second amine may be an aliphatic polyamine, including, but not limited to, ethylene diamine, diethylene triamine, triethylene tetramine, tetraethylene pentamine, pentaethylene hexamine, dipropylene triamine, tributylene tetramine, hexamethylene diamine, dihexamethylene triamine, 1,2-propane diamine, 1,3-propane diamine, 1,2-butane diamine, 1,3-butane diamine, 1,4-butane diamine, 1,5-pentane diamine, 1,6-hexane diamine, 2-methyl-1,5-pentanediamine, 2,5-dimethyl-2,5-hexanediamine and mixtures thereof.

In another aspect, the second amine may be a cycloaliphatic polyamine, including, but not limited to, isophorone diamine, 4,4'-diaminodicyclohexylmethane, methane diamine, 1,2-diaminocyclohexane, 1,4-diaminocyclohexane, and mixtures thereof.

According to another aspect, the second amine may be a polyamine having the formula (7):

wherein $R_2$ and $R_3$ are independently aliphatic or cycloaliphatic groups, and
k and p are independently integers ranging from 1 to 3.

According to another aspect, the second amine may be a polyamine having the formula (8):

wherein $R_4$ is a hydrogen, methyl, or ethyl group, and
q and t independently are integers from about 1 to about 10.

According to one aspect, the curing component includes the second amine in an amount of less than about 30 parts by weight, based on 100 parts by weight of the curing component. In another aspect, the curing component includes the second amine in an amount of less than about 25 parts by weight, and even less than about 20 parts by weight, based on 100 parts by weight of the curing component.

In still another aspect, the curing component includes the second amine in an amount of between about 10 parts by weight to about 30 parts by weight, based on 100 parts by weight of the curing component. In still another aspect, the curing component includes the second amine in an amount of between about 17.5 parts by weight to about 27.5 parts by weight, based on 100 parts by weight of the curing component.

In one embodiment, the polyetheramine and second amine are present in the curing component at a ratio of from 50:50 to 95:5, or from 60:40 to 90:10, or from 70:30 to 85:15 of the polyetheramine to second amine.

The curable component also includes an accelerant in an amount greater than 1 part by weight, or greater than 2 parts by weight, or greater than 3 parts by weight, or greater than 4 parts by weight, based on 100 parts by weight of the curable component.

In one embodiment, the accelerant is imidazole. In one particular aspect, the imidazole is a compound having one imidazole ring per molecule, such as imidazole, 2-methylimidazole, 2-ethyl-4-methylimidazole, 2-methyl-4-ethyl imidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-methylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']-ethyl-s-triazine, 2,4-diamino-6-[2'-ethyl-4-methylimidazolyl-(1)']-ethyl-s-triazine, 2,4-diamino-6-[2'-undecylimidazolyl-(1)']-ethyl-s-triazine, 2-methyl-imidazo-lium-isocyanuric acid adduct, 2-phenylimidazolium-isocyanuric acid adduct, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, 1,2-dimethylimidazole, and mixtures thereof.

In another aspect the imidazole is a compound containing 2 or more imidazole rings per molecule which can be obtained by dehydrating the above-named hydroxymethyl-containing imidazole compounds such as 2-phenyl-4,5-dihydroxymethylimidazole, 2-phenyl-4-methyl-5-hydroxymethylimidazole and 2-phenyl-4-benzyl-5-hydroxymethylimidazole; and condensing them with formaldehyde, for e.g., 4,4'-methylene-bis-(2-ethyl-5-methylimidazole).

In one embodiment, the accelerant is a tertiary amine. The tertiary amine can be selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N-dimethylcyclohexylamine, methyl dicyclohexylamine, N,N,N'-trimethyl-N'-(2-hydroxyethyl)bis(2-aminoethyl)ether, bis-(2-dimethylaminoethyl) ether, N,N'-dimethyl piperazine, 1,3,5-tris(3-(dimethylamino)propyl)-hexahydro-s-triazine, 2,4,6-tris(dimethylaminomethyl)phenol, and combinations thereof.

In another embodiment, the accelerant is a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N,N'-trimethyl-N'-(2-hydroxyethyl)bis(2-aminoethyl)ether, bis-(2-dimethylaminoethyl) ether, N,N'-dimethyl piperazine, 1,3,5-tris(3-(dimethylamino)propyl)-hexahydro-s-triazine, and combinations thereof, and the curing component is curing component is substantially free of a cyclic carbonate, guanidine and derivatives thereof, and an aromatic amine.

In yet another embodiment, the accelerant is imidazole and a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, methyldiethanolamine, N,N-dimethylcyclohexylamine, methyl dicyclohexylamine, N,N,N'-trimethyl-N'-(2-hydroxyethyl)bis(2-aminoethyl)ether, bis-(2-dimethylaminoethyl) ether, N,N'-dimethyl piperazine, 1,3,5-tris(3-(dimethylamino)propyl)-hexahydro-s-triazine, 2,4,6-tris(dimethylaminomethyl)phenol, and combinations thereof.

According to one aspect, the curing component includes the accelerant in an amount greater than about 5 parts by weight, based on 100 parts by weight of the curing component. In another aspect, the curing component includes the accelerant in an amount greater than about 7.5 parts by weight, based on 100 parts by weight of the curing component. In yet another aspect, the curing component includes the accelerant in an amount greater than about 10 parts by weight, and even greater than about 20 parts by weight, based on 100 parts by weight of the curing component.

In still another aspect, the curing component includes the accelerant in an amount less than about 30 parts by weight, based on 100 parts by weight of the curing component. In a further aspect, the curing component includes the accelerant in an amount less than about 25 parts by weight, and even less than about 20 parts by weight, based on 100 parts by weight of the curing component.

In yet a further aspect, the curing component includes the accelerant in an amount greater than about 1 part by weight to about 30 parts by weight, based on 100 parts by weight of the curing component. In another aspect, the curing component includes the accelerant in an amount of about 7.5 parts by weight to about 25 parts by weight, based on 100 parts by weight of the curing component. In still another aspect, the curing component includes the imidazole in an amount of about 10 parts by weight to about 20 parts by weight, based on 100 parts by weight of the curing component.

In still another aspect, the curable composition of the present disclosure may optionally contain one or more other additives which are useful for their intended uses. For example, the optional additives useful in the curable composition may include, but are not limited to, diluents (1,4-butanediol diglycidyl ether (BDDGE), 1,6 hexanediol diglycidyl ether (HDDGE), cresol diglycidyl ether (CGE), C12-14 alkyl glycidyl ether (AGE), trimethylol propane triglycidyl ether (TMPTGE)), inert fillers, reinforced fibers, stabilizers, surfactants, flow modifiers, pigments or dyes, release agents, matting agents, degassing agents, flame retardants (e.g., inorganic flame retardants, halogenated flame retardants, and non-halogenated flame retardants such as phosphorus-containing materials), toughening agents (for e.g. carboxyl terminated liquid butadiene acrylonitrile rubber (CTBN), acrylic terminated liquid butadiene acrylonitrile rubber (ATBN), epoxy terminated liquid butadiene acrylonitrile rubber (ETBN), liquid epoxy resin (LER) adducts of elastomers and preformed core-shell rubbers), curing initiators, curing inhibitors, wetting agents, processing aids, fluorescent compounds, UV stabilizers, antioxidants, impact modifiers and mixtures thereof.

When reinforced fibers are included in the curable composition, the fibers can be in continuous, chopped and/or fabric form. Known or customary fibers can be used and can include but are not limited to, a carbon fiber (for e.g. polyacrylonitrile (PAN)-based carbon fiber, a pitch-based carbon fiber, and a vapor-grown carbon fiber), a glass fiber, an aramid fiber, a boron fiber, a graphite fiber, a silicon carbide fiber, a high-strength polyethylene fiber, a tungsten carbide fiber, a poly-p-phenylenebenzoxazole fiber (PBO fiber) and mixtures thereof. Among them, a carbon fiber, a glass fiber, and an aramid fiber are preferred from the viewpoint of mechanical properties (such as toughness). Particularly preferred is a carbon fiber.

Examples of the form of the fiber can include, but are not limited to, the forms of a filament (continuous fiber), a tow, unidirectional material including tows unidirectionally aligned, a woven fabric, and a nonwoven fabric. Examples of such woven fabrics of fibers include plain fabrics, twill fabrics, satin fabrics, and stitching sheets which are typified by non-crimp fabrics and produced by preparing a sheet including unidirectionally aligned fiber bundles or a sheet including such fiber bundles laminated with varying lamination angles, and stitching the sheet in order to create integrality of the fabric.

Concentrations of the reinforced fibers in the curable composition of the present disclosure can vary from about 0.2 parts by weight to about 95 parts by weight; or between about 0.2 parts by weight to about 70 parts by weight and even still between about 0.2 parts by weight to about 60 parts by weigh, based on 100 parts by weight of the curable composition.

Formulating the Curable Composition

The curable composition may be prepared by stirring and mixing the components in a state where the components are heated if needed, without particular limitation. The curable composition of the present disclosure may be used as a 1-package type composition using previously mixed components as it is. In addition, the curable composition may also be used as a multi-package type (e.g., 2-package type) composition obtained by mixing two or more separately prepared components at a predetermined ratio before use. The stirring/mixing method is not particularly limited. For example, there can be used a known or customary stirring/mixing unit such as a mixer (e.g., a dissolver or a homogenizer), a kneader, a roll, a bead mill, or a planetary stirring apparatus. The mixture after stirring and mixing may be subjected to defoam in a vacuum.

In one aspect, the curable composition of the present disclosure is achieved by admixing in a vessel the components including the epoxy resin and the curing component and then allowing the components to formulate into a curable composition. There is no criticality to the order of mixture, i.e., the components may be admixed in any order to provide the curable composition of the present disclosure. Any of the above-mentioned optional additives, for example fillers or reinforced fibers, may also be added to the composition during the mixing or prior to the mixing to form the curable composition.

In the curable composition, the ratio of the number of the equivalents of reactive amine hydrogens in the curing component to the number of the equivalents of epoxides present in the curable composition (i.e., the "Amine/Epoxy Stoichiometric Ratio" of the curable composition) is from about 0.2 to about 1.3, or from about 0.4 to about 1, or even from about 0.4 to about 0.9, or still even from about 0.5 to about 0.85, and still even from about 0.6 to about 0.8 and in some cases from about 0.65 to about 0.75. In still other aspects, the weight ratio of epoxy resin:curing component may be at least about 1:1, and still even at least 1.2:1, and even still at least about 1.5:1. In other aspects the weight ratio of epoxy resin:curing component may be at least about 2:1, and still even at least 2.5:1, and even still at least about 3:1.

The components may be mixed and dispersed at a temperature enabling the preparation of an effective curable composition having a low viscosity for the desired application. The temperature during the mixing of the components may generally be from about 0° C. to about 100° C. or from about 0° C. to about 50° C.

In another aspect, the present disclosure provides a process for preparing a resin coated substrate. The process steps include contacting a substrate with the curable composition of the present disclosure. Compositions of the present disclosure may be contacted with the substrate by any method known to those skilled in the art. Examples of such contacting methods include, but are not limited to, dipping, spray coating, die coating, roll coating, resin infusion processes, and contacting the substrate with a bath containing the curable composition. The substrate may be, for example, plastic, glass, alloy, metal, ceramic, wood, cement, concrete, rubber, or reinforced fiber material.

According to another aspect, the curable composition, once mixed and contacted with any suitable substrate may be cured according to typical processes practiced by the industry to form a cured product. Typical curing processes include ambient temperature cure to elevated temperature cure using thermal, radiation or a combination of energy sources. The curable composition may be cured in one step or multiple steps such as A. B staged cures often practiced in the composites industries. Or, the curable composition may be post-cured using a different temperature or energy source after the initial cure cycle.

Accordingly, the present disclosure also provides a cured article obtained by contacting any suitable substrate with the curable composition and curing the curable composition using thermal, radiation or a combination of energy sources. In one aspect, curing may be accomplished thermally by applying heat to the curable composition at a temperature of from about 0° C. to about 230° C., or from about 60° C. to about 110° C., for a period of time from about 1 minute to about 8 hours, or from about 30 minutes to about 4 hours. Optionally, molded forms of the cured article may be further post-cured at a temperature of from about 100° C. to about 200° C. for a period of time of about 30 minutes to about 12 hours under vacuum. This desirably produces a homogeneous, void-free, and fully cured article.

In addition, the curable composition of the present disclosure may be used in methods for bonding one or more substrates together by contacting one or more surfaces of like or dissimilar substrates to be bonded with the curable composition under conditions sufficient to cure the curable composition. Such conditions are those generally used in current known processes practiced by one skilled in the art and may include application of pressure and/or heat.

In an alternative aspect, by curing the curable composition of the present disclosure, a composite article may be obtained by techniques well known in the industry, for example, by pultrusion, infusion, molding, encapsulating or coating. Thus, the curable composition of the present disclosure may be used in methods for manufacturing composite articles, such as castings, prepregs, bonding sheets, laminates and metal-foil clad laminates. The properties of the composite articles can be tailored for certain applications by the addition of reinforced fibers.

Thus, in another aspect, there is provided a process for producing a composite article including the steps of: (i) providing a layer or bundle of reinforced fibers; (ii) providing the curable composition; contacting the reinforced fibers with the curable composition to coat and/or impregnate the reinforced fibers; and (iv) curing the coated and/or impregnated reinforced fibers at a temperature of at least about 60° C.; or at least about 120° C., or even still at least about 195° C.

Coating and/or impregnation may be affected by either a wet method or hot melt method. In the wet method, the curable composition is first dissolved in a solvent to lower viscosity, after which coating and/or impregnation of the reinforced fibers is effected and the solvent evaporated off using an oven or the like. In the hot melt method, coating and/or impregnation may be effected by directly coating and/or impregnating the reinforced fibers with the curable composition which has been heated to reduce its viscosity, or alternatively, a coated film of the curable composition may first be produced on release paper or the like, and the film placed on one or both sides of the reinforced fibers and heat and pressure applied to effect coating and/or impregnation of the composition, According to another aspect, there is provided a method for producing a composite article in a RIM system. The process includes the steps of: a) introducing a fiber preform comprising reinforced fibers into a mold; b) injecting the curable composition into the mold, c) allowing the curable composition to impregnate the fiber preform; and d) heating the resin impregnated preform at a temperature of least about 60° C.; or at least about 120° C.; or even at least about 195° C., for a period of time to produce an at least partially cured composite article; and e) optionally subjecting the partially composite solid article to post curing operations at a temperature of from about 100° C. to about 250° C.

In an alternative aspect, the present disclosure provides a method for forming a composite article in a VaR™ system. The process includes the steps of a) introducing a fiber preform comprising reinforced fibers into a mold; b) injecting the curable composition into the mold; c) reducing the pressure within the mold; d) maintaining the mold at about the reduced pressure; e) allowing the curable composition to impregnate the fiber preform; and f) heating the resin impregnated preform at a temperature of at least about 60° C., or at least about 120° C., or even at least about 195° C., for a period of time to produce an at least partially cured composite article; and e) optionally subjecting the at least partially cured composite article to post curing operations at a temperature of from about 100° C. to about 250° C.

The cured article and composite articles of the present disclosure may be used in various applications, for example, in aerospace applications, where they may be employed as aircraft primary structural materials (main wings, tail wing, floor beam, etc), secondary structural materials (flap, aileron, cowl, fairing, interior trim, etc), rocket motor cases, structural materials for artificial satellites, and the like. In addition, they may be employed as structural materials for moving bodies such as cars, boats and railway carriages, drive shafts, fuel cells, plate springs, wind turbine blades, pressure vessels, fly-wheels, papermaking rollers, civil engineering and building materials (roofing materials, cables, reinforcing bars, retrofitting materials) and the like. The cured articles and composite articles of the present disclosure can also be used as a constituent material for a high-pressure tank such as a hydrogen tank and a liquefied natural gas (LNG) tank, for example.

In another aspect, the curable composition is used for producing wind turbine blades in a molding. The molding may be lined either with or without a fiber-reinforcing material, and/or else fiber-reinforcing materials may additionally be added to the curable composition. The fiber-reinforcing materials may be woven fabrics, uniaxial and multiaxial laid fabrics, nonwovens, and short fibers of the following fiber materials: glass fibers, carbon fibers, aramid fibers, PE fibers (Dyneema), and basalt fibers.

The wind turbine blades are produced preferably by a process in which a corresponding mold is provided, the curable composition is introduced into this mold, and the curable composition is cured to completion only when the mold has been completely filled. The curable composition is introduced into the corresponding mold in most embodiments by way of infusion technology. In this case a vacuum is applied to the molding. This vacuum draws the curable composition into the mold under suction at temperatures below the initial curing temperature, and so the viscosity, during the filling operation remains virtually unchanged and all of the regions of the molding are filled before fully curing. This is followed by complete curing of the curable composition in the molding at a temperature of at least 60° C., for example between 60°-150° C.

Examples

For Examples 1a-1f, 2a-2f, and 3a-3f, a mixture of JEFFAMINE® D-230 polyetheramine and isophorone diamine was combined at a weight ratio of 70/30 and then added to an epoxy resin (Hexion MGS™ RIMR 235 resin) followed by the addition of various amounts of imidazole (see Table 1 below).

TABLE 1

| | Epoxy resin (gram) | D230/IPDA (70/30) (gram) | Imidazole (gram) | Imidazole/Amine |
|---|---|---|---|---|
| 1 | | | | |
| 1a | 25.00 | 8.501 | 0.000 | 0.00 |
| 1b | 25.00 | 8.501 | 0.425 | 0.05 |
| 1c | 25.00 | 8.501 | 0.850 | 0.10 |
| 1d | 25.00 | 8.501 | 1.275 | 0.15 |
| 1e | 25.00 | 8.501 | 1.700 | 0.20 |
| 1f | 25.00 | 8.501 | 2.550 | 0.30 |
| 2 | | | | |
| 2a | 25.00 | 7.483 | 0.000 | 0.00 |
| 2b | 25.00 | 7.483 | 0.374 | 0.05 |
| 2c | 25.00 | 7.483 | 0.748 | 0.10 |
| 2d | 25.00 | 7.483 | 1.122 | 0.15 |
| 2e | 25.00 | 7.483 | 1.497 | 0.20 |
| 2f | 25.00 | 7.483 | 2.245 | 0.30 |
| 3 | | | | |
| 3a | 25.00 | 6.509 | 0.000 | 0.00 |
| 3b | 25.00 | 6.509 | 0.325 | 0.05 |
| 3c | 25.00 | 6.509 | 0.651 | 0.10 |
| 3d | 25.00 | 6.509 | 0.976 | 0.15 |
| 3e | 25.00 | 6.509 | 1.302 | 0.20 |
| 3f | 25.00 | 6.509 | 1.953 | 0.30 |

The glass transition temperatures were then measured by DSC and the results are shown below in Table 2:

TABLE 2

| 1 | 1a (° C.) | 1b (° C.) | 1c (° C.) | 1d (° C.) | 1e (° C.) | 1f (° C.) |
|---|---|---|---|---|---|---|
| Tg cured at 70° C. for 6 hours | 77 | 79 | 81 | 75 | 68 | 64 |
| Tg cured at 80° C. for 6 hours | 81 | 87 | 83 | 74 | 71 | 57 |

| 2 | 2a (° C.) | 2b (° C.) | 2c (° C.) | 2d (° C.) | 2e | 2f |
|---|---|---|---|---|---|---|
| Tg cured at 70° C. for 6 hours | 73 | 84 | 83 | 83 | — | — |
| Tg cured at 80° C. for 6 hours | 83 | 93 | 89 | 82 | — | — |

| 3 | 3a (° C.) | 3b (° C.) | 3c (° C.) | 3d (° C.) | 3e (° C.) | 3f (° C.) |
|---|---|---|---|---|---|---|
| Tg cured at 70° C. for 6 hours | 65 | 86 | 89 | 90 | — | — |
| Tg cured at 80° C. for 6 hours | 69 | 91 | 97 | 93 | — | — |

Figure 1:
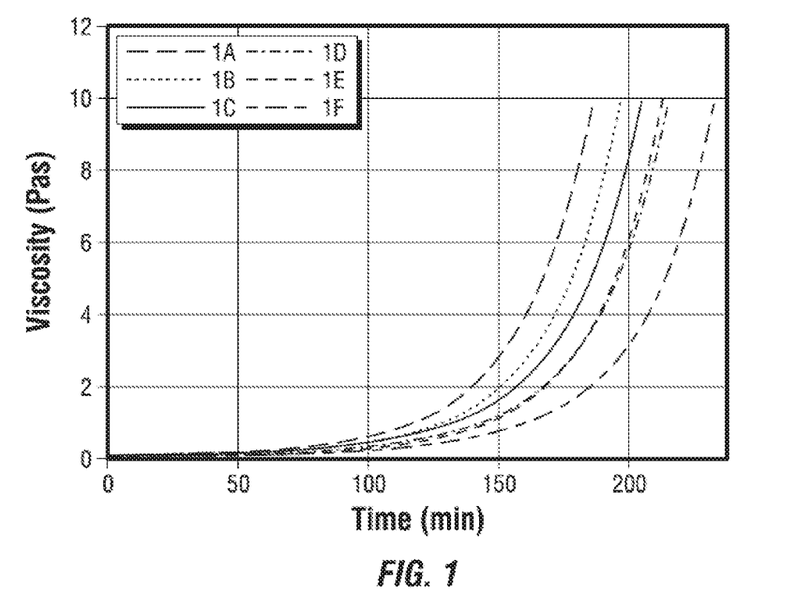
FIG. 1 depicts the cure profiles for the formulations of Examples 1a-1f.
Figure 2:
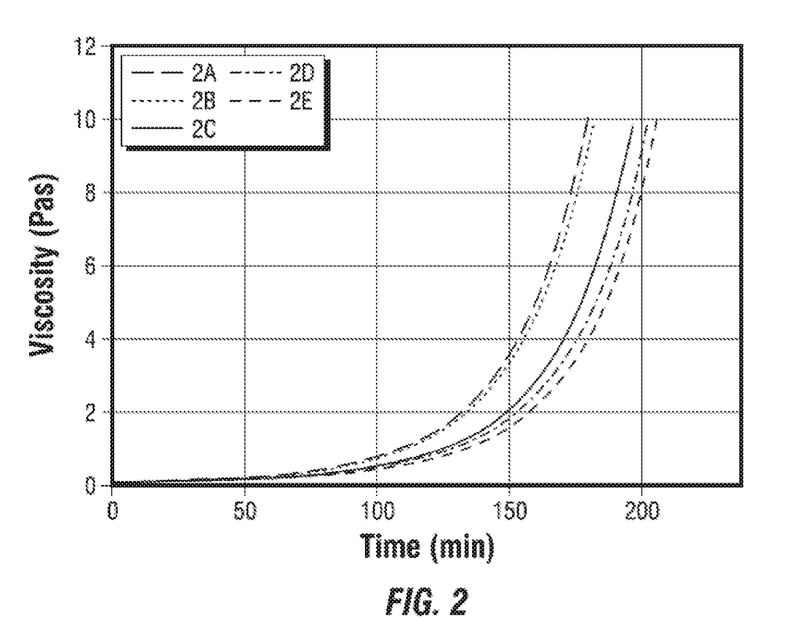
FIG. 2 depicts the cure profiles for the formulations of Examples 2a-2e.
Figure 3:
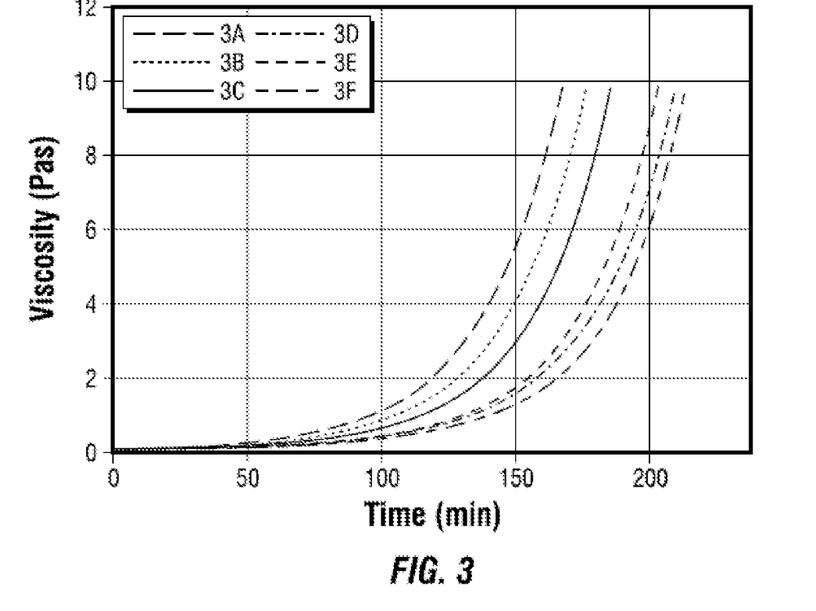
FIG. 3 depicts the cure profiles for the formulations of Examples 3a-3f.

The cure profiles were also measured by Rheometer and the results are shown in FIGS. 1, 2 and 3.

Additional examples (illustrated in Tables 3 and 4) were prepared by combining a mixture of JEFFAMINE® D-230 polyetheramine (available from Huntsman Corp. or affiliates thereof) and isophorone diamine at weight ratios of 70/30 or 85/15 which were then added to an epoxy resin (Hexion MGS™ RIMR 235 resin) followed by the addition of various amounts of a tertiary amine selected from N-methyl morpholine ("NMM"), N-ethyl morpholine ("NEM"), N-butyl morpholine ("NBM"), methoxyethyl morpholine ("MEM"), 2,2'-dimorpholinodiethylether ("DMDEE"), and N,N'-dimorpholino ethane ("DMORE"). A comparative sample was prepared not having any tertiary amine. Details for the examples are provided in Tables 3 and 4.

Isothermal cure profile data is listed in Table 3 for each example comprising a 70/30 weight ratio of JEFFAMINE® D-230 polyetheramine and isophorone diamine and in Table 4 for each example comprising a 85/15 weight ratio of JEFFAMINE® D-230 polyetheramine and isophorone diamine. The isothermal cure profile data was obtained using an AR 2000ex Rheometer from TA Instruments at 40° C. As used in Tables 3-5, the term "phr" means parts per 100 parts epoxy resin.

TABLE 3

| Ex. | Epoxy resin (gram) | Amine/Epoxy Stoichiometric Ratio | D230/IPDA (70/30) (gram) | Tertiary Amine | Amt. Tertiary Amine (phr) | Time to reach 10000 mPa · s at 40° C. (Minutes) |
|---|---|---|---|---|---|---|
| Comp. | 100 | 0.76:1 | 26 | — | — | 174 |
| 4 | 100 | 0.76:1 | 26 | NMM | 2.6 | 195 |
| 5 | 100 | 0.76:1 | 26 | NEM | 2.6 | 187 |
| 6 | 100 | 0.76:1 | 26 | DMDEE | 2.6 | 192 |
| 7 | 100 | 0.76:1 | 26 | DMDEE | 5.2 | 217 |

TABLE 4

| Example | Epoxy resin (gram) | Amine/Epoxy Stoichiometric Ratio | D230/IPDA (85/15) (gram) | Tertiary Amine | Amt. Tertiary Amine (phr) | Time to reach 10000 mPa · s at 40° C. (Minutes) |
|---|---|---|---|---|---|---|
| 8 | 100 | 0.74:1 | 26 | NMM | 2.6 | 251 |
| 9 | 100 | 0.74:1 | 26 | NEM | 2.6 | 236 |
| 10 | 100 | 0.74:1 | 26 | NBM | 2.6 | 255 |
| 11 | 100 | 0.74:1 | 26 | MEM | 2.6 | 277 |
| 12 | 100 | 0.74:1 | 26 | DMDEE | 2.6 | 254 |
| 13 | 100 | 0.74:1 | 26 | DMORE | 2.6 | 270 |

Figure 4:
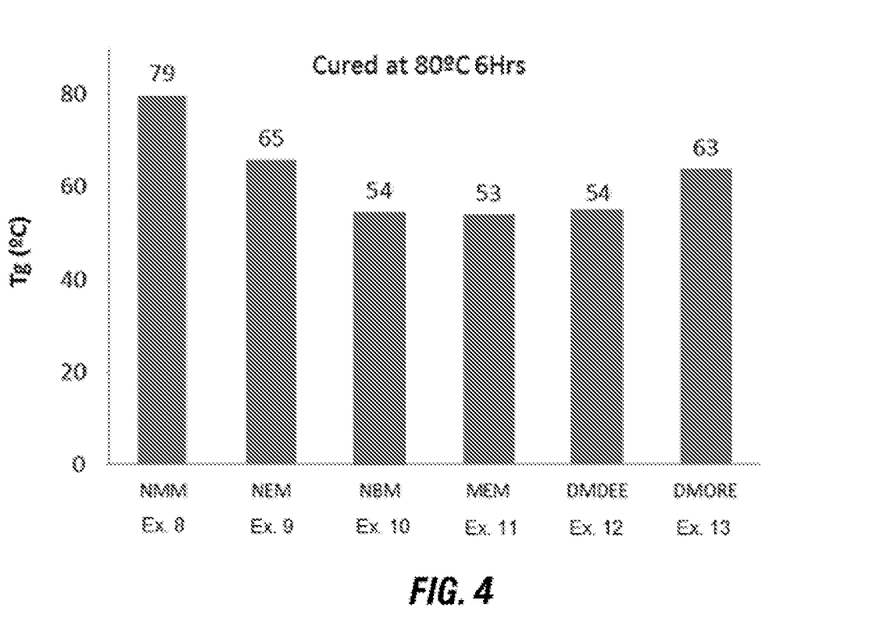
FIG. 4 depicts the glass transition temperatures for the formulations of Examples 8-11.

As can be seen in Tables 3 and 4, the use of specific tertiary amines actually slows down the system (i.e., increase the open time) by decreasing the viscosity build-up in the resin system. The glass transition temperature for examples 8-11 is depicted as the function of the chemical structure in FIG. 4. As can be seen in FIG. 4, the more bulky the substituted group attached to the nitrogen atom, the lower the Tg obtained.

Further examples were prepared by combining a mixture of JEFFAMINE® D-230 polyetheramine and isophorone diamine at various weight ratios which were then added to an epoxy resin comprising diglycidyl ether of bisphenol A (DGEBA) epoxy resin and a reactive diluent containing glycidyl group followed by addition of tetramethyl guanidine ("TMG") or dimorpholinodiethylether ("DMDEE"). Additional comparative examples were prepared without TMG or DMDEE. Details for the examples are provided in Table 5.

For most of the examples, the isothermal viscosity profile was measured using an AR 2000ex Rheometer at 30° C. and the time it took to reach 1000 mPa·s and 10,000 mPa·s are provided in Table 5.

TABLE 5

| Ex. | Epoxy resin (gram) | D230/IPDA (Ratio) & (gram) | Amine/Epoxy Stoichiometric Ratio | Tertiary Amine (phr) | Tg cured castings baked at 6 hr. at 70° C. | Initial mix viscosity (mPa · s) | Time to Reach 1000 mPa · s (min) | Time to Reach 10000 mPa · s (min) |
|---|---|---|---|---|---|---|---|---|
| 14 (Comp.) | 100 | 70/30 & 32 | 1:1 | — | 83.5 | 310 | 141 | 279 |
| 15 (Comp.) | 100 | 78/22 & 36 | 1:1 | — | 80 | 218 | 183 | 329 |

TABLE 5-continued

| Ex. | Epoxy resin (gram) | D230/IPDA (Ratio) & (gram) | Amine/Epoxy Stoichiometric Ratio | Tertiary Amine (phr) | Tg cured castings baked at 6 hr. at 70° C. | Initial mix viscosity (mPa · s) | Time to Reach 1000 mPa · s (min) | Time to Reach 10000 mPa · s (min) |
|---|---|---|---|---|---|---|---|---|
| 16 (Comp.) | 100 | 82/18 & 34 | 1:1 | — | 79.5 | 223 | 197 | 346 |
| 17 (Comp.) | 100 | 85/15 & 35 | 1:1 | — | 78.5 | — | — | — |
| 18 (Comp.) | 100 | 78/22 & 32.4 | 0.9:1 | — | 79.5 | 249 | 162 | 314 |
| 19 (Comp.) | 100 | 78/22 & 28.8 | 0.8:1 | — | 73.5 | 309 | 166 | 324 |
| 20 (Comp.) | 100 | 85/15 & 31.5 | 0.9:1 | — | 72 | 236 | 201 | 375 |
| 21 (Comp.) | 100 | 85/15 & 28 | 0.8:1 | — | 64 | 275 | 177 | — |
| 22 (Comp.) | 100 | 78/22 & 32.4 | 0.9:1 | TMG (0.5) | 83 | 280 | 188 | 353 |
| 23 (Comp.) | 100 | 78/22 & 32.4 | 0.9:1 | TMG (1.0) | 82 | 235 | 169 | 330 |
| 24 (Comp.) | 100 | 78/22 & 32.4 | 0.9:1 | TMG (1.5) | 83.5 | 197 | 171 | 315 |
| 25 | 100 | 78/22 & 36 | 1:1 | DMDEE (0.5) | 79 | 241 | 201 | 363 |
| 26 | 100 | 78/22 & 34.2 | 0.95:1 | DMDEE (0.5) | 81.5 | 257 | 195 | 355 |
| 27 | 100 | 78/22 & 34.2 | 0.95:1 | DMDEE (1.0) | 79.5 | 267 | 201 | 365 |
| 28 | 100 | 82/18 & 32.3 | 0.95:1 | DMDEE (1.0) | 74 | 250 | 197 | 362 |
| 29 | 100 | 82/18 & 32.3 | 0.95:1 | DMDEE (0.5) | 73 | 275 | 195 | 363 |

Table 6 demonstrates the mechanical properties for cured products of the curable compositions of Examples 15, 27, 16, and 29 set forth in Table 5. The cured products were produced by heating the curable compositions at 70° C. for 6 hours. The mechanical properties were measured using a Zwick testing machine according to ISO/ASTM standards. The hardness was measured using a Shore D durometer scale digital hardness tester and standard procedure.

TABLE 6

| Ex. | Tensile Modulus (Gpa) | Tensile Strength, Ultimate (MPa) | Tensile Strength at Break (MPa) | % Elongation at Break | Flexural Strength (MPa) | Flexural Modulus (Gpa) | Shore D (hardness) 1-10 seconds |
|---|---|---|---|---|---|---|---|
| 15 (Comp.) | 3.3 | 73.9 | 57.8 | 5.2 | 121 | 3.1 | 85.5 |
| 27 | 3.2 | 73.1 | 56.6 | 5.3 | 119 | 3.1 | 85.8 |
| 16 (Comp.) | 3.2 | 72.2 | 53.8 | 5.6 | 118 | 3.1 | 86.1 |
| 28 | 3.3 | 73.6 | 58.7 | 5.3 | 121 | 3.1 | 86.4 |

Tables 5 and 6 demonstrates that compositions comprising DMDEE have an increased open time as compared to similar compositions having no accelerant or TMG, yet the cured compositions resulting from the curable compositions comprising DMDEE do not show any diminished mechanical properties as compared to similar cured compositions comprising, e.g., TMG.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A curable composition comprising: (i) an epoxy resin; and (ii) a curing component comprising a polyetheramine and greater than about 7.5 parts and less than about 25 parts, based on 100 parts of the curing component, of a tertiary amine selected from N-ethyl morpholine, isopropyl morpholine, N-butyl morpholine, methoxyethyl morpholine, hydroxyethyl morpholine, 2,2'-dimorpholinodiethylether, N,N'-dimorpholino ethane, N,N'-dimethyl piperazine, 1,3,5-tris(3-(dimethylamino)propyl)-hexahydro-s-triazine, and combinations thereof.

2. The curable composition of claim 1, wherein the curing component further comprises an imidazole.

3. The curable composition of claim 1, wherein the curable composition is substantially free of a cyclic carbonate, guanidine and derivatives thereof and an aromatic amine.

4. The curable composition of claim 1, wherein the curing component further comprises a second amine.

5. The curable composition of claim 4, wherein the second amine is cycloaliphatic polyamine.

* * * * *